(12) United States Patent
Gao

(10) Patent No.: US 12,382,429 B2
(45) Date of Patent: Aug. 5, 2025

(54) METHOD FOR PUCCH RESOURCE DETERMINATION AND COMMUNICATION DEVICE

(71) Applicant: Datang Mobile Communications Equipment Co., Ltd., Beijing (CN)

(72) Inventor: Xuejuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 735 days.

(21) Appl. No.: 17/611,358

(22) PCT Filed: May 8, 2020

(86) PCT No.: PCT/CN2020/089076
§ 371 (c)(1),
(2) Date: Nov. 15, 2021

(87) PCT Pub. No.: WO2020/228588
PCT Pub. Date: Nov. 19, 2020

(65) Prior Publication Data
US 2022/0279483 A1  Sep. 1, 2022

(30) Foreign Application Priority Data
May 15, 2019 (CN) .......................... 201910403632.5

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/21* (2023.01); *H04W 72/542* (2023.01)

(58) Field of Classification Search
CPC ... H04W 72/02; H04W 72/542; H04W 72/21; H04W 72/0446
See application file for complete search history.

(56) References Cited

U.S. PATENT DOCUMENTS

2014/0092790 A1  4/2014  Zhang et al.
2017/0164211 A1  6/2017  Ho et al.
(Continued)

FOREIGN PATENT DOCUMENTS

EP    39654921 A1   3/2022
TW    1609574 B    12/2017
(Continued)

OTHER PUBLICATIONS

Extended European Search Report dated Jun. 1, 2022 for Application No. EP 20805676.2.
(Continued)

*Primary Examiner* — Rhonda L Murphy
(74) *Attorney, Agent, or Firm* — Harness, Dickey & Pierce, P.L.C.

(57) ABSTRACT

A method for PUCCH resource determination and a communication device are provided. The method includes: determining a PUCCH resource and determining a sub-slot where a PUCCH is to be transmitted; and determining a resource used for transmitting the PUCCH in the sub-slot according to the PUCCH resource.

16 Claims, 2 Drawing Sheets

Determining a PUCCH resource, and determining a sub-slot where a PUCCH is to be transmitted — 201

Determining, according to the PUCCH resource, a resource used for transmitting the PUCCH in the sub-slot — 202

(51) Int. Cl.
*H04W 72/21* (2023.01)
*H04W 72/542* (2023.01)

(56) References Cited

U.S. PATENT DOCUMENTS

2019/0357156 A1 11/2019 Lee et al.
2022/0248410 A1* 8/2022 Lee .................. H04W 52/32

FOREIGN PATENT DOCUMENTS

| TW | 1647966 B | 1/2019 |
|---|---|---|
| WO | WO-2018/060172 A1 | 4/2018 |
| WO | WO-2018/203694 A1 | 11/2018 |

OTHER PUBLICATIONS

Intel Corporation, On enhancements to UCI for eURLLC, Agenda item 7.2.6.2, 3GPP TSG RAN WG1 #97, R1-1906807, May 13-17, 2019, Reno, USA.
LG Electronics, "UCI enhancements for NR URLLC", Agenda Item 7.2.6.2, 3GPP TSG RAN WG1 #96bis, R1-1904628, Apr. 8-12, 2019, Xi'an, China.
NTT Docomo, Inc., "UCI enhancements for URLLC", Agenda Item 7.2.6.2, 3GPP TSG RAN WG1 #97, R1-1906212, May 13-17, 2019, Reno, USA.
LG Electronics, "UCI enhancements for NR URLLC", Agenda Item 7.2.6.2, 3GPP TSG RAN WG1 #97, R1-1906665, May 13-17, 2019, Reno, NV, US.
Written Opinion and International Search Report mailed Jul. 30, 2020 for International Application No. PCT/CN2020/089076.
Taiwanese Office Action for Application No. 109115846 dated Mar. 4, 2021.
Request for the Submission of an Opinion issued Apr. 15, 2024 in Korean Application No. 10-2021-7040409.
3GPP, TS38.214 v15.5.0, NR, physical layer procedures for data, Mar. 26, 2019.
Vivo, "UCI enhancements for URLLC," 3GPP TSG RAN WG1 #96, R1-1901693, Feb. 16, 2019.
Vivo, "UCI enhancements for URLLC, "3GPP TSG RAN WG1 #96bis, R1-1904082, Apr. 3, 2019.
Request for the Submission of an Opinion issued Dec. 23, 2024 in Korean Application No. 10-2021-7040409.
"3GPP, TS38.213 v15.5.0, NR, physical layer procedures for control, 3GPP server publication date (Mar. 28, 2019)".

* cited by examiner

METHOD FOR PUCCH RESOURCE DETERMINATION AND COMMUNICATION DEVICE

CROSS-REFERENCE TO RELATED APPLICATION

This application is the U.S. national phase of PCT Application No. PCT/CN2020/089076 filed on May 8, 2020, which claims priority to Chinese Patent Application No. 201910403632.5 filed in China on May 15, 2019, which are incorporated in their entirety by reference herein.

TECHNICAL FIELD

The present disclosure relates to the field of communication technologies, and in particular to a method for physical uplink control channel (Physical Uplink Control Channel, PUCCH) resource determination and a communication device.

BACKGROUND

In a communication process, a terminal usually needs to send a PUCCH carrying uplink control information (Uplink Control Information, UCI) to a network side device, such as a PUCCH carrying at least one of a hybrid automatic repeat request acknowledgement (Hybrid Automatic Repeat request Acknowledgement, HARQ-ACK), channel state information (Channel State Information, CSI) or a scheduling request (Scheduling Request, SR). However, a communication system in the related technologies only supports transmission of one PUCCH carrying UCI in a slot, that is, PUCCH resources are determined in units of slots, which results in relatively low transmission efficiency of PUCCHs.

SUMMARY

Embodiments of the present disclosure provide a method for PUCCH resource determination and a communication device to solve the problem of relatively low transmission efficiency of PUCCHs.

The embodiments of the present disclosure provide a method for PUCCH resource determination, including:
determining a PUCCH resource, and determining a sub-slot where a PUCCH is to be transmitted; and
determining, according to the PUCCH resource, a resource used for transmitting the PUCCH in the sub-slot.

Optionally, a start symbol of the PUCCH resource is a relative start symbol with respect to a start position of the sub-slot.

Optionally, the determining the PUCCH resource includes:
determining at least one PUCCH resource from a PUCCH resource set according to a PUCCH resource indication field in a physical downlink control channel (PDCCH); or,
determining at least one PUCCH resource configured by higher layer signaling.

Optionally, the determining the at least one PUCCH resource from the PUCCH resource set according to the PUCCH resource indication field in the PDCCH includes:
in a case that a hybrid automatic repeat request acknowledgement (HARQ-ACK) needs to be fed back in the sub-slot for a physical downlink shared channel (PDSCH) scheduled by the PDCCH, and/or, an HARQ-ACK needs to be fed back in the sub-slot for the PDCCH indicating semi-persistent scheduling (SPS) PDSCH release, selecting a PUCCH resource set from a group of PUCCH resource sets according to the quantity of bits of uplink control information (UCI) that includes the HARQ-ACK and is transmitted in the sub-slot, and determining at least one PUCCH resource from the PUCCH resource set according to the PUCCH resource indication field in the PDCCH.

Optionally, PUCCH resources in the group of PUCCH resource sets are applicable to multiple sub-slots in a slot; and/or
the group of PUCCH resource sets includes one or more PUCCH resource sets.

Optionally, in a case that the quantity of the PDCCH is more than one, the PUCCH resource indication field is a PUCCH resource indication field of a PDCCH whose time domain position is a last one among time domain positions of the more than one PDCCHs.

Optionally, the determining the at least one PUCCH resource configured by the higher layer signaling includes:
in a case of only feeding back an HARQ-ACK for an SPS PDSCH, determining at least one PUCCH resource configured by the higher layer signaling for feeding back the HARQ-ACK for the SPS PDSCH; or,
in a case of only feeding back channel state information (CSI), or transmitting CSI and an HARQ-ACK on a PUCCH resource corresponding to the CSI, or transmitting CSI, an HARQ-ACK and a scheduling request (SR) on a PUCCH resource corresponding to the CSI, determining at least one PUCCH resource configured by the higher layer signaling for CSI feedback; or,
in a case of only feeding back an SR or transmitting an HARQ-ACK on a PUCCH resource corresponding to an SR, determining at least one PUCCH resource configured by the higher layer signaling for SR feedback; or,
in a case of only feeding back CSI and an SR, determining at least one PUCCH resource configured by the higher layer signaling for the CSI.

Optionally, the determining, according to the PUCCH resource, the resource used for transmitting the PUCCH in the sub-slot includes:
determining the resource used for transmitting the PUCCH in the sub-slot according to at least one of a start symbol index of a PUCCH or the quantity of PUCCH occupation symbols of the PUCCH resource.

Optionally, the determining the resource used for transmitting the PUCCH in the sub-slot according to at least one of the start symbol index of the PUCCH or the quantity of the PUCCH occupation symbols of the PUCCH resource includes:
determining that the PUCCH is to be transmitted by occupying L symbols starting from an (s+1)-th symbol in the sub-slot, according to the start symbol index of the PUCCH and the quantity of the PUCCH occupation symbols of the PUCCH resource, where s is the start symbol index of the PUCCH, s is numbered from 0, and L is the quantity of the PUCCH occupation symbols; or,
according to the start symbol index of the PUCCH and the quantity of the PUCCH occupation symbols of the PUCCH resource and a start symbol of the sub-slot, determining that the resource used for transmitting the PUCCH in the sub-slot includes: L symbols starting from a symbol with an index of (s+j) in a slot containing the sub-slot, where s is the start symbol index of the PUCCH, s is numbered from 0, the start symbol of the sub-slot has an index of j in the slot, j is numbered from 0, and L is the quantity of the PUCCH occupation symbols.

Optionally, in a case that a time domain position for transmitting the PUCCH determined according to the PUCCH resource crosses a boundary of the sub-slot, determining an end symbol of the PUCCH in the sub-slot as an end symbol of the sub-slot.

Optionally, that the time domain position for transmitting the PUCCH determined according to the PUCCH resource crosses the boundary of the sub-slot includes:

the quantity of symbols used for transmitting the PUCCH determined according to the PUCCH resource exceeds the quantity of symbols of the sub-slot; and/or, an end symbol of the PUCCH determined according to the PUCCH resource is after the end symbol of the sub-slot.

Optionally, a time domain position for transmitting the PUCCH determined according to the PUCCH resource does not cross a boundary of the sub-slot.

Optionally, that the time domain position for transmitting the PUCCH determined according to the PUCCH resource does not cross the boundary of the sub-slot includes:

the quantity of PUCCH occupation symbols corresponding to the PUCCH resource is less than or equal to the quantity of symbols in a sub-slot with a minimum quantity of symbols in a slot; and/or, an end symbol of the PUCCH transmitted in a sub-slot determined according to the start symbol index of the PUCCH and the quantity of PUCCH occupation symbols corresponding to the PUCCH resource is not after an end symbol of a sub-slot with the minimum quantity of symbols in the slot.

The embodiments of the present disclosure also provide a communication device, including:

a first determining module, configured to determine a PUCCH resource, and determine a sub-slot where a PUCCH is to be transmitted; and a second determining module, configured to determine, according to the PUCCH resource, a resource used for transmitting the PUCCH in the sub-slot.

Optionally, a start symbol of the PUCCH resource is a relative start symbol with respect to a start position of the sub-slot.

Optionally, the first determining module is configured to determine at least one PUCCH resource from a PUCCH resource set according to a PUCCH resource indication field in a PDCCH; or, the first determining module is configured to determine at least one PUCCH resource configured by higher layer signaling.

Optionally, the first determining module is configured to:

in a case that a hybrid automatic repeat request acknowledgement (HARQ-ACK) needs to be fed back in the sub-slot for a physical downlink shared channel (PDSCH) scheduled by the PDCCH, and/or, an HARQ-ACK needs to be fed back in the sub-slot for the PDCCH indicating semi-persistent scheduling (SPS) PDSCH release, select a PUCCH resource set from a group of PUCCH resource sets according to the quantity of bits of UCI that includes the HARQ-ACK and is transmitted in the sub-slot, and determine at least one PUCCH resource from the PUCCH resource set according to the PUCCH resource indication field in the PDCCH.

Optionally, PUCCH resources in the group of PUCCH resource sets are applicable to multiple sub-slots in a slot; and/or the group of PUCCH resource sets includes one or more PUCCH resource sets.

Optionally, in a case that the quantity of the PDCCH is more than one, the PUCCH resource indication field is a PUCCH resource indication field of a PDCCH whose time domain position is a last one among time domain positions of the more than one PDCCHs.

Optionally, the first determining module is configured to:
in a case of only feeding back an HARQ-ACK for an SPS PDSCH, determine at least one PUCCH resource configured by the higher layer signaling for feeding back the HARQ-ACK for the SPS PDSCH; or, the first determining module is configured to: in a case of only feeding back channel state information (CSI), or transmitting CSI and an HARQ-ACK on a PUCCH resource corresponding to the CSI, or transmitting CSI, an HARQ-ACK and a scheduling request (SR) on a PUCCH resource corresponding to the CSI, determine at least one PUCCH resource configured by the higher layer signaling for CSI feedback; or, the first determining module is configured to: in a case of only feeding back an SR or transmitting an HARQ-ACK on a PUCCH resource corresponding to an SR, determine at least one PUCCH resource configured by the higher layer signaling for SR feedback; or, the first determining module is configured to: in a case of only feeding back CSI and an SR, determine at least one PUCCH resource configured by the higher layer signaling for the CSI.

Optionally, the second determining module is configured to determine the resource used for transmitting the PUCCH in the sub-slot according to at least one of a start symbol index of a PUCCH or the quantity of PUCCH occupation symbols of the PUCCH resource.

Optionally, the second determining module is configured to: determine that the PUCCH is to be transmitted by occupying L symbols starting from an (s+1)-th symbol in the sub-slot, according to the start symbol index of the PUCCH and the quantity of the PUCCH occupation symbols of the PUCCH resource, where s is the start symbol index of the PUCCH, s is numbered from 0, and L is the quantity of the PUCCH occupation symbols; or, the second determining module is configured to: according to the start symbol index of the PUCCH and the quantity of the PUCCH occupation symbols of the PUCCH resource and a start symbol of the sub-slot, determine that the resource used for transmitting the PUCCH in the sub-slot includes: L symbols starting from a symbol with an index of (s+j) in a slot containing the sub-slot, where s is the start symbol index of the PUCCH, s is numbered from 0, the start symbol of the sub-slot has an index of j in the slot, j is numbered from 0, and L is the quantity of the PUCCH occupation symbols.

Optionally, in a case that a time domain position for transmitting the PUCCH determined according to the PUCCH resource crosses a boundary of the sub-slot, an end symbol of the PUCCH in the sub-slot is determined as an end symbol of the sub-slot.

Optionally, that the time domain position for transmitting the PUCCH determined according to the PUCCH resource crosses the boundary of the sub-slot includes:

the quantity of symbols used for transmitting the PUCCH determined according to the PUCCH resource exceeds the quantity of symbols of the sub-slot; and/or, an end symbol of the PUCCH determined according to the PUCCH resource is after the end symbol of the sub-slot.

Optionally, a time domain position for transmitting the PUCCH determined according to the PUCCH resource does not cross a boundary of the sub-slot.

Optionally, that the time domain position for transmitting the PUCCH determined according to the PUCCH resource does not cross the boundary of the sub-slot includes:

the quantity of PUCCH occupation symbols corresponding to the PUCCH resource is less than or equal to the quantity of symbols in a sub-slot with a minimum quantity of symbols in a slot; and/or, an end symbol of the PUCCH transmitted in a sub-slot determined according to the start symbol index of the PUCCH and the quantity of PUCCH occupation symbols corresponding to the PUCCH resource is not after an end symbol of a sub-slot with the minimum quantity of symbols in the slot.

The embodiments of the present disclosure also provide a communication device, including: a transceiver, a memory, a processor, and a program stored on the memory and executable by the processor;

where the processor is configured to determine a PUCCH resource, and determine a sub-slot where a PUCCH is to be transmitted; and where the processor is further configured to determine, according to the PUCCH resource, a resource used for transmitting the PUCCH in the sub-slot.

Optionally, a start symbol of the PUCCH resource is a relative start symbol with respect to a start position of the sub-slot.

Optionally, the determining the PUCCH resource includes:

determining at least one PUCCH resource from a PUCCH resource set according to a PUCCH resource indication field in a physical downlink control channel (PDCCH); or, determining at least one PUCCH resource configured by higher layer signaling.

Optionally, the determining the at least one PUCCH resource from the PUCCH resource set according to the PUCCH resource indication field in the PDCCH includes:

in a case that a hybrid automatic repeat request acknowledgement (HARQ-ACK) needs to be fed back in the sub-slot for a physical downlink shared channel (PDSCH) scheduled by the PDCCH, and/or, an HARQ-ACK needs to be fed back in the sub-slot for the PDCCH indicating semi-persistent scheduling (SPS) PDSCH release, selecting a PUCCH resource set from a group of PUCCH resource sets according to the quantity of bits of uplink control information (UCI) that includes the HARQ-ACK and is transmitted in the sub-slot, and determining at least one PUCCH resource from the PUCCH resource set according to the PUCCH resource indication field in the PDCCH.

Optionally, PUCCH resources in the group of PUCCH resource sets are applicable to multiple sub-slots in a slot; and/or the group of PUCCH resource sets includes one or more PUCCH resource sets.

Optionally, in a case that the quantity of the PDCCH is more than one, the PUCCH resource indication field is a PUCCH resource indication field of a PDCCH whose time domain position is a last one among time domain positions of the more than one PDCCHs.

Optionally, the determining the at least one PUCCH resource configured by the higher layer signaling includes:

in a case of only feeding back an HARQ-ACK for an SPS PDSCH, determining at least one PUCCH resource configured by the higher layer signaling for feeding back the HARQ-ACK for the SPS PDSCH; or, in a case of only feeding back channel state information (CSI), or transmitting CSI and an HARQ-ACK on a PUCCH resource corresponding to the CSI, or transmitting CSI, an HARQ-ACK and a scheduling request (SR) on a PUCCH resource corresponding to the CSI, determining at least one PUCCH resource configured by the higher layer signaling for CSI feedback; or, in a case of only feeding back an SR or transmitting an HARQ-ACK on a PUCCH resource corresponding to an SR, determining at least one PUCCH resource configured by the higher layer signaling for SR feedback; or, in a case of only feeding back CSI and an SR, determining at least one PUCCH resource configured by the higher layer signaling for the CSI.

Optionally, the determining, according to the PUCCH resource, the resource used for transmitting the PUCCH in the sub-slot includes:

determining the resource used for transmitting the PUCCH in the sub-slot according to at least one of a start symbol index of a PUCCH or the quantity of PUCCH occupation symbols of the PUCCH resource.

Optionally, the determining the resource used for transmitting the PUCCH in the sub-slot according to at least one of the start symbol index of the PUCCH or the quantity of the PUCCH occupation symbols of the PUCCH resource includes:

determining that the PUCCH is to be transmitted by occupying L symbols starting from an (s+1)-th symbol in the sub-slot, according to the start symbol index of the PUCCH and the quantity of the PUCCH occupation symbols of the PUCCH resource, where s is the start symbol index of the PUCCH, s is numbered from 0, and L is the quantity of the PUCCH occupation symbols; or, according to the start symbol index of the PUCCH and the quantity of the PUCCH occupation symbols of the PUCCH resource and a start symbol of the sub-slot, determining that the resource used for transmitting the PUCCH in the sub-slot includes: L symbols starting from a symbol with an index of (s+j) in a slot containing the sub-slot, where s is the start symbol index of the PUCCH, s is numbered from 0, the start symbol of the sub-slot has an index of j in the slot, j is numbered from 0, and L is the quantity of the PUCCH occupation symbols.

Optionally, in a case that a time domain position for transmitting the PUCCH determined according to the PUCCH resource crosses a boundary of the sub-slot, determining an end symbol of the PUCCH in the sub-slot as an end symbol of the sub-slot.

Optionally, that the time domain position for transmitting the PUCCH determined according to the PUCCH resource crosses the boundary of the sub-slot includes:

the quantity of symbols used for transmitting the PUCCH determined according to the PUCCH resource exceeds the quantity of symbols of the sub-slot; and/or, an end symbol of the PUCCH determined according to the PUCCH resource is after the end symbol of the sub-slot.

Optionally, a time domain position for transmitting the PUCCH determined according to the PUCCH resource does not cross a boundary of the sub-slot.

Optionally, that the time domain position for transmitting the PUCCH determined according to the PUCCH resource does not cross the boundary of the sub-slot includes:

the quantity of PUCCH occupation symbols corresponding to the PUCCH resource is less than or equal to the quantity of symbols in a sub-slot with a minimum quantity of symbols in a slot; and/or, an end symbol of the PUCCH transmitted in a sub-slot determined according to the start symbol index of the PUCCH and the quantity of PUCCH occupation symbols corresponding to the PUCCH resource is not after an end symbol of a sub-slot with the minimum quantity of symbols in the slot.

The embodiments of the present disclosure also provide a computer-readable storage medium, having a program stored thereon, where the program, when being executed by a processor, implements the steps of the method for PUCCH resource determination according to the embodiments of the present disclosure.

In the embodiments of the present disclosure, the PUCCH resource is determined, and the sub-slot where the PUCCH transmission is located is determined; the resource used for transmitting the PUCCH in the sub-slot is determined according to the PUCCH resource. In this way, PUCCH resource(s) can be determined in units of sub-slots, and the embodiments of the present disclosure can improve transmission efficiency of PUCCH(s) as compared with a manner where PUCCH resources are determined in units of slots.

DETAILED DESCRIPTION

In order to facilitate understanding of the technical problems to be solved, technical solutions and advantages of the present disclosure, descriptions are provided in detail hereinafter with reference to the drawings and the specific embodiments.

Figure 1:
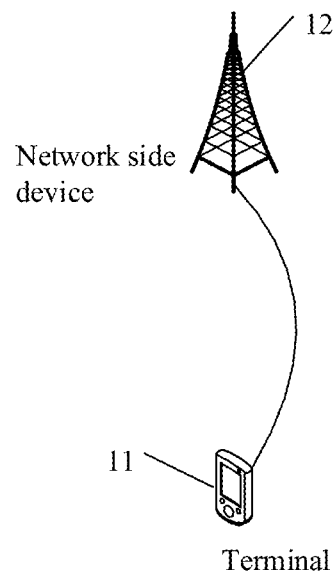
FIG. 1 is a schematic diagram of a network structure applicable to embodiments of the present disclosure.

Reference is made to FIG. 1, which is a schematic diagram of a network structure applicable to the embodiments of the present disclosure. As shown in FIG. 1, it includes a terminal 11 and a network side device 12. The terminal 11 may be a user equipment (User Equipment, UE) or other terminal devices, such as: a mobile phone, a tablet computer (Tablet Personal Computer), a laptop computer (Laptop Computer), a personal digital assistant (Personal Digital Assistant, PDA), a mobile Internet device (Mobile Internet Device, MID), a wearable device (Wearable Device), a robot, a vehicle or other terminal side devices. It should be noted that a specific type of the terminal is not limited in the embodiments of the present disclosure. The network side device 12 may be a base station, such as a macro station, an LTE eNB, a 5G NR NB, etc.; the network side device may be a small station, such as a low power node (Low Power Node, LPN), a pico, a femto, or other small stations, or the network side device may be an access point (Access Point, AP); the network side device may be a network node formed by a central unit (Central Unit, CU) and multiple transmission reception points (Transmission Reception Point, TRP) managed and controlled by it. It should be noted that the specific type of network side device is not limited in the embodiments of the present disclosure. In the embodiments of the present disclosure, the communication device may be a terminal or a network side device.

Figure 2:
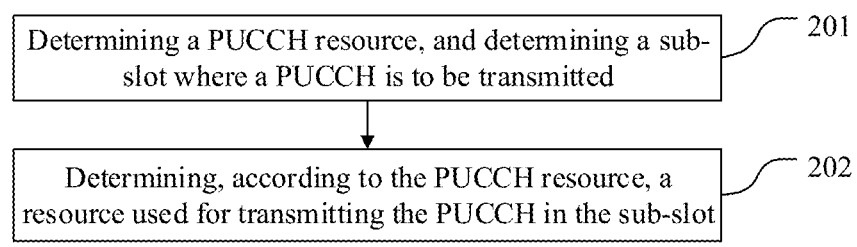
FIG. 2 is a flowchart of a method for PUCCH resource determination provided by embodiments of the present disclosure.

Reference is made to FIG. 2. FIG. 2 is a flowchart of a method for PUCCH resource determination provided by embodiments of the present disclosure. As shown in FIG. 2, the method includes the following steps.

Step 201 includes: determining a PUCCH resource, and determining a sub-slot where a PUCCH is to be transmitted.

Step 202 includes: determining, according to the PUCCH resource, a resource used for transmitting the PUCCH in the sub-slot.

The sub-slot refers to one or more sub-slots among multiple sub-slots obtained by dividing a slot. For example, if a slot is divided into multiple sub-slots, a PUCCH may be transmitted in each sub-slot, that is, each sub-slot supports PUCCH transmission. The quantity of sub-slots obtained by dividing a slot may be variable, such as configuring through higher layer signaling or defining through a protocol. For example, a slot (14 symbols) may be divided into two sub-slots, and a length of symbols in each sub-slot is 7. For example, a slot may be divided into 4 sub-slots, a length of symbols in each of two sub-slots is 3, and a length of symbols in each of two sub-slots is 4. For example, a slot may be divided into 7 sub-slots, and a length of symbols in each sub-slot is 2.

In addition, the determining the PUCCH resource in the above may include selecting one or more PUCCH resources from a pre-configured PUCCH resource set, such as: determining at least one PUCCH resource from a PUCCH resource set according to a PUCCH resource indication field in a PDCCH.

The determining the sub-slot where the PUCCH is to be transmitted in the above may include: determining, in a slot, the sub-slot where the PUCCH is to be transmitted, according to an HARQ-ACK feedback timing indication field in the PDCCH (that is, an indication field used to indicate the K1 value). K1 may be in units of sub-slots, and is used to indicate the sub-slot interval between an end position of a PDSCH (or the PDCCH indicating SPS PDSCH release) and the sub-slot where the PUCCH carrying its HARQ-ACK is to be transmitted. For example, 8 K1 values are pre-configured by the higher layer signaling; a PDCCH schedules a PDSCH to be transmitted in a slot n, the PDCCH includes a 3-bit HARQ-ACK feedback timing indication field which may indicate one of the 8 K1 values pre-configured by the higher layer signaling; it is assumed that K1 indicated in the PDCCH is equal to 4, then it means that there are 4 sub-slots between an end of the PDSCH and the sub-slot where the PUCCH carrying the HARQ-ACK is located; it is assumed that one slot includes 2 sub-slots, and the end position of the PDSCH is an end position of the slot n, then it may be determined that the PUCCH is to be transmitted in the second sub-slot in slot n+2. In the embodiments of the present disclosure, how to determine the sub-slot where the PUCCH is to be transmitted is not limited. For example, if only one K1 value is configured through higher layer signaling, the corresponding sub-slot where the PUCCH is to be transmitted may be directly determined based on the K1 value and the end position of the PDSCH, that is, the K1 value does not need to be indicated by the PDCCH in this case and is obtained directly according to configuration of the higher layer signaling. The correspondence between the sub-slot where the PUCCH is to be transmitted and the sub-slot where the PDSCH (or the PDCCH indicating the SPS PDSCH release) is located may be pre-determined through a protocol.

The determining, according to the PUCCH resource, the resource used for transmitting the PUCCH in the sub-slot may include: determining, in the sub-slot, a resource corresponding to the PUCCH resource, as the resource used for transmitting the PUCCH.

It should be noted that in the embodiments of the present disclosure, the resource used for transmitting the PUCCH in the sub-slot may be referred to as a PUCCH resource in the sub-slot, that is, the resource used for transmitting the PUCCH may be referred to as a PUCCH resource. In addition, the method may further include: transmitting the PUCCH on the resource used for transmitting the PUCCH, for example, the terminal sends the PUCCH on the resource used for transmitting the PUCCH, and the network side device receives the PUCCH on the resource used for transmitting the PUCCH.

In addition, in the above method, resources used for transmitting PUCCHs in multiple sub-slots in a same slot may be determined, so as to transmit the PUCCHs in these multiple sub-slots, where a manner for determining the resource used for transmitting the PUCCH for each sub-slot of the multiple sub-slots may be the manner for determining the resource used for transmitting the PUCCH in the above steps, which are not described in detail herein. Optionally, one or more PUCCHs may be transmitted in each sub-slot.

In addition, in the embodiments of the present disclosure, content carried by the PUCCH includes, but is not limited to, at least one of an HARQ-ACK, CSI, or an SR.

It should be noted that the above method may be applied to a communication device, such as a terminal or a network side device.

In the embodiments of the present disclosure, through the above steps, the PUCCH resource in the sub-slot may be determined according to the PUCCH resource and the sub-slot where the PUCCH transmission is located. In this way, PUCCH resource(s) are determined in the units of sub-slots, without increasing PUCCH resource configuration overhead, hence, transmitting multiple PUCCH resources on the basis of the sub-slots can be supported in a slot, which improves the transmission efficiency of PUCCHs.

As an optional implementation, a start symbol of the PUCCH resource is a relative start symbol with respect to a start position of the sub-slot.

In this implementation, since the start symbol of the PUCCH resource is the relative start symbol with respect to the start position of the sub-slot, the PUCCH resource is associated with a boundary of the sub-slot to determine the resource used for transmitting the PUCCH in the sub-slot, so as to realize that in a case that multiple sub-slots are included in a slot, a PUCCH resource pool shared by the multiple sub-slots may be configured based on higher layer signaling, to accurately determine the resource used for transmitting the PUCCH in the sub-slot.

For example, a start symbol index of a PUCCH of the PUCCH resource is #1, it occupies 2 symbols, and the sub-slot is the fourth sub-slot in slot n+2, then the resource used for transmitting the PUCCH is two symbols starting from the second symbol in the fourth sub-slot, that is, the PUCCH is to be transmitted on the second and third symbols in the fourth sub-slot.

As an optional implementation, the determining the PUCCH resource includes:
  determining at least one PUCCH resource from a PUCCH resource set according to a PUCCH resource indication field in a physical downlink control channel (PDCCH); or,
  determining at least one PUCCH resource configured by higher layer signaling.

The PDCCH may be a PDCCH for scheduling a PDSCH, or may be a PDCCH for indicating SPS PDSCH release, etc., which is not limited.

In addition, the PUCCH resource set may be configured to the terminal by higher layer signaling, or may be defined by a protocol, etc.

Optionally, the determining the at least one PUCCH resource from the PUCCH resource set according to the PUCCH resource indication field in the PDCCH may include:
  in a case that hybrid automatic repeat request acknowledgement (HARQ-ACK) needs to be fed back in the sub-slot for a physical downlink shared channel (PDSCH) scheduled by the PDCCH, and/or, HARQ-ACK needs to be fed back in the sub-slot for the PDCCH indicating semi-persistent scheduling (SPS) PDSCH release, selecting a PUCCH resource set from a group of PUCCH resource sets according to the quantity of bits of uplink control information (UCI) that includes the HARQ-ACK and is transmitted in the sub-slot, and determining at least one PUCCH resource from the PUCCH resource set according to the PUCCH resource indication field in the PDCCH.

The group of PUCCH resource sets includes one or more PUCCH resource sets, and each PUCCH resource set corresponds a quantity of bits of UCI. For example, higher layer signaling may configure a group of PUCCH resource sets to include 1 to 4 PUCCH resource sets, different PUCCH resource sets correspond to different quantities of bits of UCI, and each PUCCH resource set includes multiple PUCCH resources; the first PUCCH resource set is used to carry UCI transmission of no more than 2 bits, the second PUCCH resource set is used to carry UCI transmission of 3 to N1 bits, the third PUCCH resource set is used to carry UCI transmission of N1+1 to N2 bits, and the fourth PUCCH resource set is used to carry UCI transmission of N2+1 to 1706 bits, where N1 and N2 are positive integers configured by higher layer signaling or defined in a protocol. If no more than 2 sets are configured, there is no need to configure N1. In a case that 2 sets are configured, N1 is fixed to be 1706. If no more than 3 sets are configured, there is no need to configure N2. In a case that 3 sets are configured, N2 is fixed to be 1706. The first PUCCH resource set may include a maximum of 32 PUCCH resources, and each of the remaining PUCCH resource sets may include a maximum of 8 PUCCH resources.

It should be noted that the UCI that includes the HARQ-ACK may be an HARQ-ACK only, or, an HARQ-ACK and CSI, or, an HARQ-ACK and an SR, or, an HARQ-ACK, CSI and an SR.

Optionally, PUCCH resources in the group of PUCCH resource sets are applicable to multiple sub-slots in a slot.

The PUCCH resources in the group of PUCCH resource sets being applicable to the multiple sub-slots in the slot may refer to that: higher layer signaling may configure only one group of PUCCH resource sets for a terminal that supports PUCCH transmission in sub-slots, resources in the resource sets may be applicable to any sub-slot according to the above rule, that is, the group of PUCCH resource sets is shared by all sub-slots in the slot. In this way, support of PUCCH transmission by more sub-slots can be achieved, thereby further improving the transmission efficiency of PUCCHs.

Optionally, in a case that the quantity of the PDCCH is more than one, the PUCCH resource indication field is a PUCCH resource indication field of a PDCCH whose time domain position is a last one among time domain positions of the more than one PDCCHs. If there are multiple PDCCHs at the same time domain position, then it is assumed that PUCCH resource indication fields in the multiple PDCCHs are the same, or, the last PDCCH is determined according to an order of frequency domain resources from low to high or from high to low and the PUCCH resource is determined according to a PUCCH resource indication field in this PDCCH.

The multiple PDCCHs may be multiple PDCCHs for scheduling PDSCHs, multiple PDCCHs for indicating SPS PDSCH releases, or, a set formed by a PDCCH for scheduling a PDSCH and a PDCCH for indicating SPS PDSCH release.

Optionally, the determining the at least one PUCCH resource configured by the higher layer signaling may include:
in a case of only feeding back an HARQ-ACK for an SPS PDSCH, determining at least one PUCCH resource configured by the higher layer signaling for feeding back the HARQ-ACK for the SPS PDSCH; or,
in a case of only feeding back channel state information (CSI), or transmitting CSI and an HARQ-ACK on a PUCCH resource corresponding to the CSI, or transmitting CSI, an HARQ-ACK and a scheduling request (SR) on a PUCCH resource corresponding to the CSI, determining at least one PUCCH resource configured by the higher layer signaling for CSI feedback; or,
in a case of only feeding back an SR or transmitting an HARQ-ACK on a PUCCH resource corresponding to an SR, determining at least one PUCCH resource configured by the higher layer signaling for SR feedback; or,
in a case of only feeding back CSI and an SR, determining at least one PUCCH resource configured by the higher layer signaling for the CSI.

The determining at least one PUCCH resource configured by the higher layer signaling for CSI feedback, in a case of only feeding back channel state information (CSI), or transmitting CSI and an HARQ-ACK on a PUCCH resource corresponding to the CSI, or transmitting CSI, an HARQ-ACK and an SR on a PUCCH resource corresponding to the CSI, may be understood as follows:
in a case of only feeding back channel state information (CSI), determining at least one PUCCH resource configured by the higher layer signaling for CSI feedback; or,
in a case of transmitting CSI and an HARQ-ACK on a PUCCH resource corresponding to the CSI, determining at least one PUCCH resource configured by the higher layer signaling for CSI feedback; or,
in a case of transmitting CSI, an HARQ-ACK and an SR on a PUCCH resource corresponding to the CSI, determining at least one PUCCH resource configured by the higher layer signaling for CSI feedback.

In this implementation, since the PUCCH resource(s) configured by the high-layer signaling may be directly determined, the PDCCH overhead can be reduced.

As an optional implementation, the determining, according to the PUCCH resource, the resource used for transmitting the PUCCH in the sub-slot includes:
determining the resource used for transmitting the PUCCH in the sub-slot according to at least one of a start symbol index of a PUCCH or the quantity of PUCCH occupation symbols of the PUCCH resource.

The start symbol index of the PUCCH or the quantity of PUCCH occupation symbols of the PUCCH resource may be a start symbol index of a PUCCH and the quantity of PUCCH occupation symbols that are provided by the PUCCH resource or correspond to the PUCCH resource. That is, the determining the PUCCH resource in step 201 may be determining at least one of the start symbol index of the PUCCH or the quantity of PUCCH occupation symbols of the PUCCH resource.

The determining the resource used for transmitting the PUCCH in the sub-slot according to at least one of the start symbol index of the PUCCH or the quantity of PUCCH occupation symbols of the PUCCH resource may include:
determining the resource used for transmitting the PUCCH in the sub-slot according to the start symbol index of the PUCCH of the PUCCH resource; or,
determining the resource used for transmitting the PUCCH in the sub-slot according to the quantity of PUCCH occupation symbols of the PUCCH resource; or,
determining the resource used for transmitting the PUCCH in the sub-slot according to the start symbol index of the PUCCH and the quantity of PUCCH occupation symbols of the PUCCH resource.

In the case of determining the resource used for transmitting the PUCCH in the sub-slot according to the start symbol index of the PUCCH of the PUCCH resource, the quantity of PUCCH occupation symbols may be pre-configured or defined in a protocol. In the case of determining the resource used for transmitting the PUCCH in the sub-slot according to the quantity of PUCCH occupation symbols of the PUCCH resource, the start symbol index of the PUCCH may be pre-configured or defined in a protocol.

In this implementation, since the resource used for transmitting the PUCCH in the sub-slot is determined according to at least one of the start symbol index of the PUCCH or the quantity of PUCCH occupation symbols of the PUCCH resource, the resource used for transmitting the PUCCH in the sub-slot can be determined accurately.

Optionally, the determining the resource used for transmitting the PUCCH in the sub-slot according to at least one of the start symbol index of the PUCCH or the quantity of the PUCCH occupation symbols of the PUCCH resource may include:
determining that the PUCCH is to be transmitted by occupying L symbols starting from an (s+1)-th symbol in the sub-slot, according to the start symbol index of the PUCCH and the quantity of the PUCCH occupation symbols of the PUCCH resource, where s is the start symbol index of the PUCCH, s is numbered from 0, and L is the quantity of the PUCCH occupation symbols.

For example: if it is determined to transmit the PUCCH in the first sub-slot in slot n+1, and it is assumed that the start symbol index of the PUCCH of the determined PUCCH resource is #1 and it occupies 2 symbols, then the PUCCH is to be transmitted by occupying 2 symbols starting from the second symbol in the first sub-slot in slot n+1, that is, the PUCCH is to be transmitted on the second and third symbols in the first sub-slot.

Optionally, the determining the resource used for transmitting the PUCCH in the sub-slot according to at least one of the start symbol index of the PUCCH or the quantity of the PUCCH occupation symbols of the PUCCH resource may include:

according to the start symbol index of the PUCCH and the quantity of the PUCCH occupation symbols of the PUCCH resource and a start symbol of the sub-slot, determining that the resource used for transmitting the PUCCH in the sub-slot may include:

L symbols starting from a symbol with an index of (s+j) in a slot containing the sub-slot, where s is the start symbol index of the PUCCH, s is numbered from 0, the start symbol of the sub-slot has an index of j in the slot, j is numbered from 0, and L is the quantity of the PUCCH occupation symbols.

For example, if it is determined to transmit PUCCH in the second sub-slot in slot n+1, and it is assumed that the start symbol index of the PUCCH of the determined PUCCH resource is #1 and it occupies 2 symbols, then it may be determined that the PUCCH in the second sub-slot is to be transmitted by occupying 2 symbols starting from a symbol in slot n+2 with an index of s+j=1+4=5 since the start symbol of the second sub-slot has an index of j=4, that is, transmission is performed on symbols with indexes of 5 and 6 (that is, the sixth and seventh symbols) in the slot n+1.

It should be noted that each of s and j is numbered from 0, and the embodiments of the present disclosure are not limited thereto. For example, in some scenarios, s may start from 1, so that it may be determined that the PUCCH is to be transmitted by occupying L symbols starting from an s-th symbol in the sub-slot.

Optionally, in a case that a time domain position for transmitting the PUCCH determined according to the PUCCH resource crosses a boundary of the sub-slot, an end symbol of the PUCCH in the sub-slot is an end symbol of the sub-slot.

That the time domain position for transmitting the PUCCH determined according to the PUCCH resource crosses the boundary of the sub-slot includes:

the quantity of symbols used for transmitting the PUCCH determined according to the PUCCH resource exceeds the quantity of symbols of the sub-slot; and/or, an end symbol of the PUCCH determined according to the PUCCH resource is after the end symbol of the sub-slot.

For example, it is assumed that the start symbol index of the PUCCH corresponding to the selected PUCCH resource is #1 and it occupies 3 symbols, then the PUCCH is to be transmitted by occupying 3 symbols starting from the second symbol in the second sub-slot in slot n+2, that is, the symbols with indexes of 5, 6, and 7 in slot n+2 are used for transmission. The last symbol exceeds the boundary of the second sub-slot and falls in the third sub-slot, in this case, both the terminal and the network side device adopt a truncation method for this situation, that is, it is directly determined that the PUCCH in the second sub-slot only occupies two symbols with indexes of 5 and 6 in slot n+2 for transmission, and related transmission parameters, such as time-domain orthogonal sequences, are determined according to transmission of the two symbols.

In this implementation, since the network side device and the terminal have the same understanding of the truncation behavior, an error that transmission and reception do not correspond may not occur, which improves the transmission reliability of the PUCCH(s).

Optionally, it may also always be considered that a time domain position for transmitting the PUCCH determined according to the PUCCH resource does not cross a boundary of the sub-slot.

For example, the terminal side always assumes that the time domain position for transmitting the PUCCH determined according to the PUCCH resource does not cross the boundary of the sub-slot, so it may directly determine the time domain position for transmitting the PUCCH in the sub-slot according to the PUCCH resource; it thinks that the time domain position for transmitting the PUCCH determined in this way does not cross the boundary of the sub-slot, that is, the terminal does not expect the time domain position for transmitting the PUCCH determined according to the PUCCH resource to cross the boundary of the sub-slot, and if this happens, the terminal may think that an error occurs in scheduling or indicating or configuring by the network side.

For example, when the network side device performs configuration, it ensures that the time domain position for transmitting the PUCCH determined according to the PUCCH resource does not cross the boundary of the sub-slot. That is, when configuring the PUCCH resource set or PUCCH resources to the terminal through higher layer signaling (such as configuring each PUCCH resource in the PUCCH resource set through higher layer signaling, or configuring the PUCCH resource for HARQ-ACK PUCCH of the SPS PDSCH through higher layer signaling, or configuring the PUCCH resource for CSI through higher layer signaling, or configuring the PUCCH resource for SR through higher layer signaling), for configuring of each of these PUCCH resources, a sub-slot with a minimum quantity of symbols is taken as the basis, to ensure that: when determining, in any sub-slot, the time domain position for transmitting the PUCCH in this sub-slot according to any PUCCH resource, the time domain position does not cross the boundary of the sub-slot. Or, when the network side configures PUCCH resources, it does not guarantee that a time domain position for transmitting a PUCCH in a sub-slot determined according to some PUCCH resources thereof does not cross the boundary of the sub-slot, and a reasonable PUCCH resource indication field needs to be set in the PDCCH, to reasonably select a PUCCH resource, which ensures that the time domain position used for transmitting the PUCCH in the sub-slot determined according to the PUCCH resource does not cross the boundary of the sub-slot.

That the time domain position for transmitting the PUCCH determined according to the PUCCH resource does not cross the boundary of the sub-slot may include:

the quantity of PUCCH occupation symbols corresponding to the PUCCH resource is less than or equal to the quantity of symbols in a sub-slot with a minimum quantity of symbols in a slot; and/or, an end symbol of the PUCCH transmitted in a sub-slot determined according to the start symbol index of the PUCCH and the quantity of PUCCH occupation symbols corresponding to the PUCCH resource is not after an end symbol of a sub-slot with the minimum quantity of symbols in the slot.

For example, it is assumed that when the network side device configures the PUCCH resource set to the terminal, it considers a smallest sub-slot among sub-slots divided from a slot; that is, it is determined, according to a length of 3 symbols of the smallest sub-slot, that a length of any configured PUCCH resource does not exceed 3 symbols, and the final result of the application of the start symbol and the length of symbols does not cause symbols occupied by the PUCCH to cross the boundary of the sub-slot, i.e., s+L does not exceed 3; that is, if s=0, the start symbol is the first symbol in the slot, and L may be 1, 2, 3, so as to ensure that the end symbol is an end symbol of a sub-slot with a length of 3 at the farthest. If s=1, then L may be 1 or 2; and if s=2, then L=1. For example, it is assumed that the start symbol index of the PUCCH corresponding to the selected PUCCH resource is #1 and it occupies 2 symbols, then the PUCCH is to be transmitted by occupying 2 symbols starting from the second symbol in the second sub-slot in slot n+2, that is, the PUCCH carrying 4-bit HARQ-ACK is to be transmitted on the second and third symbols in the second sub-slot. In this case, if the above indexes are converted to indexes of symbols in slot n+2, then it may be determined that the PUCCH in the second sub-slot is to be transmitted by occupying 2 symbols starting from a symbol in slot n+2 with an index of s+j=1+4=5 since the start symbol of the second sub-slot has an index of j=4, that is, transmission is performed on symbols with indexes of 5 and 6 in the slot n+2.

For another example, when the network side device configures the PUCCH resource set for the terminal, it is configured that an index of a start symbol corresponding to a PUCCH resource 1 is #0 and it occupies 4 symbols, and it is configured that an index of a start symbol corresponding to another PUCCH resource a is #1 and it occupies 2 symbols; if the base station sends a PDCCH to schedule a PDSCH for which the PUCCH in a sub-slot containing only 3 symbols in a slot needs to be transmitted, the PUCCH resource 2 needs to be indicated through the PUCCH resource indication field in the PDCCH, which prevents the PUCCH resource 1 from being indicated to the terminal, so as to ensure that the time domain position for transmitting the PUCCH in the sub-slot containing 3 symbols determined by the terminal according to the indicated PUCCH resource does not cross the boundary of the sub-slot.

In this implementation, it can be ensured that the time domain position for transmitting the PUCCH determined according to the PUCCH resource does not cross the boundary of the sub-slot, thereby improving the transmission reliability of the PUCCH.

In the embodiments of the present disclosure, the PUCCH resource is determined, and the sub-slot where the PUCCH transmission is located is determined; the resource used for transmitting the PUCCH in the sub-slot is determined according to the PUCCH resource. In this way, PUCCH resources can be determined in units of sub-slots, and the embodiments of the present disclosure can improve transmission efficiency of PUCCHs as compared with a manner where PUCCH resources are determined in units of slots.

A case where a slot is divided into 4 sub-slots is taken as an example hereinafter.

Embodiments

It is assumed that a slot is divided into 4 sub-slots, where a length of each of the first sub-slot and the fourth sub-slot is 4 symbols, and a length of each of the second sub-slot and third sub-slot is 3 symbols. It is assumed that, according to K1 indication in a PDCCH that schedules a PDSCH (which is in units of sub-slots, and is used to indicate the sub-slot interval between an end position of the PDSCH and the sub-slot where its HARQ-ACK is transmitted), it is determined that HARQ-ACK needs to be fed back in the second sub-slot in slot n+2 for 4 PDSCHs and it is determined that HARQ-ACK needs to be fed back in the fourth sub-slot in slot n+2 for 2 PDSCHs. It is assumed that each PDSCH corresponds to a 1-bit HARQ-ACK; it is assumed that higher layer signaling pre-configures 2 PUCCH resource sets for the terminal, the first PUCCH resource set contains 8 resources and corresponds to UCI transmission of 1 to 2 bits, specific information about each PUCCH resource includes a corresponding PUCCH format (format 0 or format 1), a start symbol index of a PUCCH (assuming that it starts from 0), the quantity of PUCCH occupation symbols, indexes of occupied RBs, an index of a cyclic shift, an index of an orthogonal sequence (format 1), or other information required for a certain PUCCH format; the second PUCCH resource set contains 8 resources and corresponds to UCI transmission of more than 2 bits, specific information about each PUCCH resource includes a corresponding PUCCH format (format 2 or format 3 or format 4), a start symbol index of a PUCCH, the quantity of PUCCH occupation symbols, an index of a start RB, the quantity of occupied RBs (format 2 and format 3), an index of an orthogonal sequence (format 4) or other information required for a certain PUCCH format. The start symbol index of the PUCCH is configured relative to the boundary of the sub-slot, that is, if a start symbol index of a PUCCH corresponding to a PUCCH resource is #0, it means that it is the first symbol in a sub-slot, and an index of the symbol relative to a slot is determined based on the index j of the start symbol of the sub-slot, i.e., j+0 j; the above two PUCCH resource sets are shared by each sub-slot, that is, only these two PUCCH resource sets are configured and are applied to PUCCH transmission in all sub-slots.

In the second sub-slot in slot n+2, according to the method for HARQ-ACK codebook, it is assumed that it is determined that 4-bit HARQ-ACK needs to be fed back, then the second PUCCH resource set is selected according to the 4-bit UCI transmission, and a PUCCH resource is selected from the 8 PUCCH resources in the second PUCCH resource set according to a PUCCH resource indication field in the last PDCCH among PDCCHs (i.e., the PDCCHs scheduling these PDSCHs) corresponding to 4 PDSCHs for which HARQ-ACK needs to be fed back in this sub-slot:

Method 1: it is assumed that when the network side device configures the PUCCH resource set to the terminal, it considers a smallest sub-slot among sub-slots divided from a slot; that is, it is determined, according to a length of 3 symbols of the smallest sub-slot, that a length of any configured PUCCH resource does not exceed 3 symbols, and the final result of the application of the start symbol and the length of symbols does not cause symbols occupied by the PUCCH to cross the boundary of the sub-slot, i.e., s+L does not exceed 3; that is, if s=0, the start symbol is the first symbol in the slot, and L may be 1, 2, 3, so as to ensure that the end symbol is an end symbol of a sub-slot with a length of 3 at the farthest; if s=1, then L may be 1 or 2; and if s=2, then L=1. For example, it is assumed that the start symbol index of the PUCCH corresponding to the selected PUCCH resource is #1 and it occupies 2 symbols, then the PUCCH is to be transmitted by occupying 2 symbols starting from the second symbol in the second sub-slot in slot n+2, that is, the PUCCH carrying the 4-bit HARQ-ACK is to be transmitted on the second and third symbols in the second sub-slot. In this case, if the above indexes are converted to indexes of symbols in slot n+2, then it may be determined that the PUCCH in the second sub-slot is to be transmitted by occupying 2 symbols starting from a symbol in slot n+2 with an index of s+j=1+4=5 since the start symbol of the second sub-slot has an index of j=4, that is, transmission is performed on symbols with indexes of 5 and 6 in the slot n+2.

Method 2: without the above configuration assumptions, a situation where s+L exceeds the maximum length of a sub-slot may occur, so that symbols for transmitting the PUCCH in the sub-slot determined according to the PUCCH resource crosses the boundary of the sub-slot. In this case, the part beyond the boundary may be truncated. For example, it is assumed that the start symbol index of the PUCCH corresponding to the selected PUCCH resource is #1 and it occupies 3 symbols, then the PUCCH is to be transmitted by occupying 3 symbols starting from the second symbol in the second sub-slot in slot n+2, that is, the symbols with indexes of 5, 6, and 7 in slot n+2 are used for transmission. The last symbol exceeds the boundary of the second sub-slot and falls in the third sub-slot, in this case, both the terminal and the network side device adopt a truncation method for this situation, that is, it is directly determined that the PUCCH in the second sub-slot only occupies two symbols with indexes of 5 and 6 in slot n+2 for transmission, and related transmission parameters, such as time-domain orthogonal sequences, are determined according to transmission of the two symbols. Since the network side device and the terminal have the same understanding of the truncation behavior, an error that transmission and reception do not correspond may not occur.

In addition, in the fourth sub-slot in slot n+2, according to the method for HARQ-ACK codebook, it is assumed that it is determined that 2-bit HARQ-ACK needs to be fed back, then the first PUCCH resource set is selected according to the 2-bit UCI transmission, and a PUCCH resource is selected from the 8 PUCCH resources in the first PUCCH resource set according to a PUCCH resource indication field in the last PDCCH among PDCCHs (i.e., the PDCCHs scheduling these PDSCHs) corresponding to 2 PDSCHs for which HARQ-ACK needs to be fed back in this sub-slot:

Method 1: As above, in this case, since the fourth sub-slot contains 4 symbols and the PUCCH resources are always configured according to s+L not exceeding 3, the problem of crossing a boundary of a sub-slot does not occur for a sub-slot containing 4 symbols. It is assumed that the start symbol index of the PUCCH corresponding to the selected PUCCH resource is #1 and it occupies 2 symbols, then the PUCCH is to be transmitted by occupying 2 symbols starting from the second symbol in the fourth sub-slot in slot n+2, that is, the PUCCH carrying the 2-bit HARQ-ACK is to be transmitted on the second and third symbols in the fourth sub-slot. In this case, if the above indexes are converted to indexes of symbols in slot n+2, then it may be determined that the PUCCH in the fourth sub-slot is to be transmitted by occupying 2 symbols starting from a symbol in slot n+2 with an index of s+j=1+10=11 since the start symbol of the fourth sub-slot has an index of j=10, that is, transmission is performed on symbols with indexes of 11 and 12 in the slot n+2.

Method 2: as above, no configuration restriction is made. For example, PUCCH resource configuration is performed according to a length of a sub-slot containing the largest quantity of symbols in a slot, then a situation where s+L=4 may be configured. For example, it is assumed that the start symbol index of the PUCCH corresponding to the selected PUCCH resource is #0 and it occupies 4 symbols, then the PUCCH is to be transmitted by occupying 4 symbols starting from the first symbol in the fourth sub-slot in slot n+2, that is, the symbols with indexes of 10, 11, 12 and 13 in slot n+2 are used for transmission; in this case, crossing of the boundary does not occur. For another example, s+L>4 may be configured. For example, it is assumed that the start symbol index of the PUCCH corresponding to the selected PUCCH resource is #1 and it occupies 4 symbols, then the PUCCH is to be transmitted by occupying 4 symbols starting from the second symbol in the fourth sub-slot in slot n+2; the last symbol exceeds the boundary of the fourth sub-slot and truncation is performed; it is determined that the PUCCH occupies all the symbol of the fourth sub-slot for transmissions, the PUCCH occupies the symbols with indexes of 10, 11, 12 and 13 in slot n+2 for transmission; related transmission parameters, such as time-domain orthogonal sequences, are determined according to transmission of the four symbols. Since the network side device and the terminal have the same understanding of the truncation behavior, an error that transmission and reception do not correspond may not occur.

It should be noted that, in the above embodiments, if it is determined according to K1 to transmit in other sub-slots in slot n+2, or to transmit in other slots, the processing method is the same. For example, for 4 PDSCHs which should have been transmitted in the second sub-slot in slot n+2, if it is determined according to K1 that they are transmitted in the first sub-slot in slot n+1, it is assumed the determined PUCCH resource is the same as that in the above; that is, the start symbol index of the PUCCH corresponding to the selected PUCCH resource is #1 and it occupies 2 symbols, then the PUCCH is to be transmitted by occupying 2 symbols starting from the second symbol in the first sub-slot in slot n+1, that is, the PUCCH carrying the 4-bit HARQ-ACK is to be transmitted on the second and third symbols in the first sub-slot. In this case, if the above indexes are converted to indexes of symbols in slot n+1, then it may be determined that the PUCCH in the first sub-slot is to be transmitted by occupying 2 symbols starting from a symbol in slot n+2 with an index of s+j=1+0=1 since the start symbol of the first sub-slot has an index of j=0, that is, transmission is performed on symbols with indexes of 1 and 2 in the slot n+1. It can be seen that the same PUCCH resource in the PUCCH resource set may be applied to different sub-slots, but the actual PUCCH time domain position that is finally determined changes with the position of the sub-slot. Therefore, the same PUCCH resource that is configured is shared by all sub-slots, thereby avoiding configuration complexity and configuration overhead caused by independently configuring a PUCCH resource for each sub-slot.

It should be noted that the above embodiments only take the determination of the PUCCH resource corresponding to the HARQ-ACK transmission for the PDSCH scheduled by the PDCCH as an example. If CSI and/or an SR needs to be transmitted simultaneously with the HARQ-ACK, all bits of all UCI need to be considered when determining the PUCCH resource set, and other behaviors are consistent with those in the above. If it is replaced with HARQ-ACK feedback for SPS PDSCH (SPS HARQ-ACK), or CSI transmission, or SR transmission or the like, the processing manner is similar to that in the above except that the determined PUCCH resource is a PUCCH resource pre-configured for SPS HARQ-ACK or CSI or SR through higher layer signaling. In a case of SPS HARQ-ACK, the sub-slot where the corresponding transmission is located may be determined according to the corresponding K1 value, the start symbol in the sub-slot and whether truncation is needed may be determined based on the start symbol in the PUCCH resource configured by the higher layer, whether truncation is needed is determined, and transmission is performed according to the determined positions of symbols; in a case of CSI or SR, the sub-slot where the corresponding transmission is located may be determined according to periodic configuration, the start symbol in the sub-slot and whether truncation is needed may be determined based on the start symbol in the PUCCH resource configured by the higher layer, and transmission is performed according to the determined positions of symbols.

It should be noted that in the above embodiments, when determining the resource for the PUCCH in the sub-slot according to the determined PUCCH resource, only the time domain resource position in the sub-slot needs to be determined, and other information, such as resource block (Resource Block, RB) position or initial cyclic shift may be determined in a manner that has been defined in a protocol, or may be determined in a manner newly defined in a subsequent version of a protocol, which is not limited in the embodiments of the present disclosure.

In addition, in the above embodiments, a case where a slot is divided into 4 sub-slots is only taken as an example, and the division manners for the 4 sub-slots are merely examples. Other division manners and other quantities of sub-slots may be applicable to the above method.

In the embodiments of the present disclosure, the PUCCH resource is associated with the boundary of the sub-slot to determine the resource for the PUCCH in the sub-slot; in a case that the time domain position for the PUCCH determined according to the PUCCH resource crosses the boundary of the sub-slot, an end symbol of the transmitted PUCCH in the sub-slot is determined to be an end symbol of the sub-slot, or it is always assumed that the PUCCH resource(s) is configured based on a length of symbols of a sub-slot with a minimum quantity of symbols a the slot, which ensures that each PUCCH resource in a sub-slot does not exceed the boundary of the sub-slot.

The embodiments of the present disclosure provide a method for configuring PUCCH resource(s) when transmission of multiple PUCCHs carrying HARQ-ACKs in a slot on the basis of sub-slots is supported. By only configuring PUCCH resource set(s) shared by all sub-slots, in conjunction with fixed symbol offset among sub-slots, PUCCH resource configuration for all sub-slots is achieved, which ensures that the terminal can flexibly obtain a PUCCH resource in each sub-slot without increasing the configuration overhead.

Figure 3:
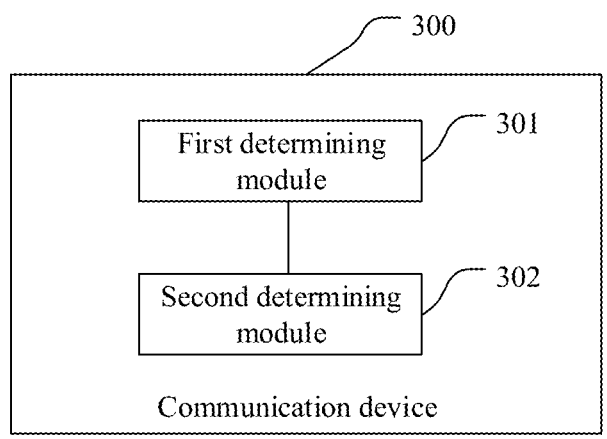
FIG. 3 is a structural diagram of a communication device provided by embodiments of the present disclosure.

Reference is made to FIG. 3, which is a structural diagram of a communication device provided by embodiments of the present disclosure. As shown in FIG. 3, the communication device 300 includes:
a first determining module 301, configured to determine a PUCCH resource, and determine a sub-slot where a PUCCH is to be transmitted; and
a second determining module 302, configured to determine, according to the PUCCH resource, a resource used for transmitting the PUCCH in the sub-slot.

Optionally, a start symbol of the PUCCH resource is a relative start symbol with respect to a start position of the sub-slot.

Optionally, the first determining module 301 is configured to determine at least one PUCCH resource from a PUCCH resource set according to a PUCCH resource indication field in a PDCCH; or,
the first determining module 301 is configured to determine at least one PUCCH resource configured by higher layer signaling.

Optionally, the first determining module 301 is configured to:
in a case that hybrid automatic repeat request acknowledgement (HARQ-ACK) needs to be fed back in the sub-slot for a physical downlink shared channel (PDSCH) scheduled by the PDCCH, and/or, HARQ-ACK needs to be fed back in the sub-slot for the PDCCH indicating semi-persistent scheduling (SPS) PDSCH release, select a PUCCH resource set from a group of PUCCH resource sets according to the quantity of bits of UCI that includes the HARQ-ACK and is transmitted in the sub-slot, and determine at least one PUCCH resource from the PUCCH resource set according to the PUCCH resource indication field in the PDCCH.

Optionally, PUCCH resources in the group of PUCCH resource sets are applicable to multiple sub-slots in a slot; and/or
the group of PUCCH resource sets includes one or more PUCCH resource sets.

Optionally, in a case that the quantity of the PDCCH is more than one, the PUCCH resource indication field is a PUCCH resource indication field of a PDCCH whose time domain position is a last one among time domain positions of the more than one PDCCHs.

Optionally, the first determining module 301 is configured to: in a case of only feeding back an HARQ-ACK for an SPS PDSCH, determine at least one PUCCH resource configured by the higher layer signaling for the HARQ-ACK feedback for the SPS PDSCH; or,
the first determining module 301 is configured to: in a case of only feeding back channel state information (CSI), or transmitting CSI and an HARQ-ACK on a PUCCH resource corresponding to the CSI, or transmitting CSI, an HARQ-ACK and a scheduling request (SR) on a PUCCH resource corresponding to the CSI, determine at least one PUCCH resource configured by the higher layer signaling for CSI feedback; or,
the first determining module 301 is configured to: in a case of only feeding back an SR or transmitting an HARQ-ACK on a PUCCH resource corresponding to an SR, determine at least one PUCCH resource configured by the higher layer signaling for SR feedback; or,
the first determining module 301 is configured to: in a case of only feeding back CSI and an SR, determine at least one PUCCH resource configured by the higher layer signaling for the CSI.

Optionally, the second determining module 302 is configured to determine the resource used for transmitting the PUCCH in the sub-slot according to at least one of a start symbol index of a PUCCH or the quantity of PUCCH occupation symbols of the PUCCH resource.

Optionally, the second determining module 302 is configured to: determine that the PUCCH is to be transmitted by occupying L symbols starting from an (s+1)-th symbol in the sub-slot, according to the start symbol index of the PUCCH and the quantity of the PUCCH occupation symbols of the PUCCH resource, where s is the start symbol index of the PUCCH, s is numbered from 0, and L is the quantity of the PUCCH occupation symbols; or, the second determining module 302 is configured to:
according to the start symbol index of the PUCCH and the quantity of the PUCCH occupation symbols of the PUCCH resource and a start symbol of the sub-slot, determine that the resource used for transmitting the PUCCH in the sub-slot includes: L symbols starting from a symbol with an index of (s+j) in a slot containing the sub-slot, where s is the start symbol index of the PUCCH, s is numbered from 0, the start symbol of the sub-slot has an index of j in the slot, j is numbered from 0, and L is the quantity of the PUCCH occupation symbols.

Optionally, in a case that a time domain position for transmitting the PUCCH determined according to the PUCCH resource crosses a boundary of the sub-slot, an end symbol of the PUCCH in the sub-slot is an end symbol of the sub-slot.

Optionally, that the time domain position for transmitting the PUCCH determined according to the PUCCH resource crosses the boundary of the sub-slot includes:

the quantity of symbols used for transmitting the PUCCH determined according to the PUCCH resource exceeds the quantity of symbols of the sub-slot;
and/or,
an end symbol of the PUCCH determined according to the PUCCH resource is after the end symbol of the sub-slot.

Optionally, a time domain position for transmitting the PUCCH determined according to the PUCCH resource does not cross a boundary of the sub-slot.

Optionally, that the time domain position for transmitting the PUCCH determined according to the PUCCH resource does not cross the boundary of the sub-slot includes:

the quantity of PUCCH occupation symbols corresponding to the PUCCH resource is less than or equal to the quantity of symbols in a sub-slot with a minimum quantity of symbols in a slot; and/or,
an end symbol of the PUCCH transmitted in a sub-slot determined according to the start symbol index of the PUCCH and the quantity of PUCCH occupation symbols corresponding to the PUCCH resource is not after an end symbol of a sub-slot with the minimum quantity of symbols in the slot.

It should be noted that the communication device 300 in the embodiments may be a communication device in any implementation of the method according to the embodiments of the present disclosure. Any implementation of the communication device in the method according to the embodiments of the present disclosure may be achieved by the communication device 300 in the embodiments, and the same beneficial effects can be achieved, which is not described in detail herein.

Figure 4:
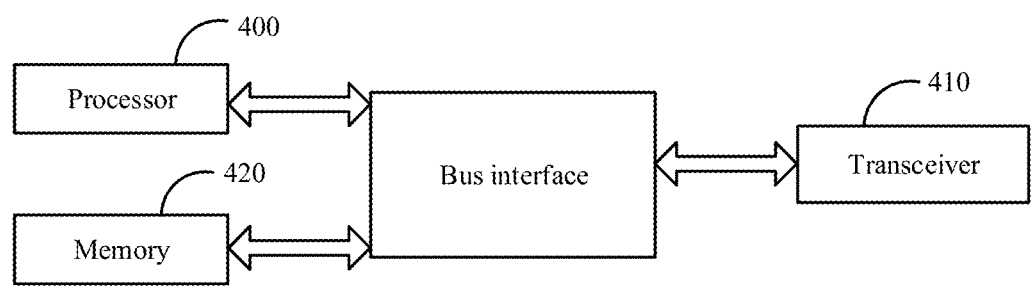
FIG. 4 is another structural diagram of a communication device provided by embodiments of the present disclosure.

Reference is made to FIG. 4, which is another structural diagram of a communication device provided by embodiments of the present disclosure. As shown in FIG. 4, the communication device includes: a transceiver 410, a memory 420, a processor 400, and a program stored on the memory 420 and executable by the processor 400.

The processor 400 is configured to determine a PUCCH resource, and determine a sub-slot where a PUCCH is to be transmitted; and determine, according to the PUCCH resource, a resource used for transmitting the PUCCH in the sub-slot.

The transceiver 410 may be configured to receive and send data under the control of the processor 400.

In FIG. 4, a bus architecture may include any quantity of interconnected buses and bridges, and various circuits of one or more processors represented by the processor 400 and a memory represented by the memory 420 are coupled. The bus architecture may also connect various other circuits such as a peripheral, a voltage regulators and a power management circuit, which are well known in the art. Therefore, a further description thereof is not provided herein. A bus interface provides an interface. The transceiver 410 may be multiple elements, that is, including a transmitter and a receiver, for providing a unit configured to communication with various other apparatuses on a transmission medium.

The processor 400 is responsible for managing the bus architecture and common processing. The memory 420 may store data being used by the processor 410 during operation.

It should be noted that the memory 420 is not limited to only being in the communication device, and the memory 420 and the processor 400 may be separated in different geographic positions.

Optionally, a start symbol of the PUCCH resource is a relative start symbol with respect to a start position of the sub-slot.

Optionally, the determining the PUCCH resource includes:

determining at least one PUCCH resource from a PUCCH resource set according to a PUCCH resource indication field in a physical downlink control channel (PDCCH); or,
determining at least one PUCCH resource configured by higher layer signaling.

Optionally, the determining the at least one PUCCH resource from the PUCCH resource set according to the PUCCH resource indication field in the PDCCH includes:

in a case that hybrid automatic repeat request acknowledgement (HARQ-ACK) needs to be fed back in the sub-slot for a physical downlink shared channel (PDSCH) scheduled by the PDCCH, and/or, HARQ-ACK needs to be fed back in the sub-slot for the PDCCH indicating semi-persistent scheduling (SPS) PDSCH release, selecting a PUCCH resource set from a group of PUCCH resource sets according to the quantity of bits of uplink control information (UCI) that includes the HARQ-ACK and is to be transmitted in the sub-slot, and determining at least one PUCCH resource from the PUCCH resource set according to the PUCCH resource indication field in the PDCCH.

Optionally, PUCCH resources in the group of PUCCH resource sets are applicable to multiple sub-slots in a slot; and/or the group of PUCCH resource sets includes one or more PUCCH resource sets.

Optionally, in a case that the quantity of the PDCCH is more than one, the PUCCH resource indication field is a PUCCH resource indication field of a PDCCH whose time domain position is a last one among time domain positions of the more than one PDCCHs.

Optionally, the determining the at least one PUCCH resource configured by the higher layer signaling includes:

in a case of only feeding back an HARQ-ACK for an SPS PDSCH, determining at least one PUCCH resource configured by the higher layer signaling for feeding back the HARQ-ACK for the SPS PDSCH; or,
in a case of only feeding back channel state information (CSI), or transmitting CSI and an HARQ-ACK on a PUCCH resource corresponding to the CSI, or transmitting CSI, an HARQ-ACK and a scheduling request (SR) on a PUCCH resource corresponding to the CSI, determining at least one PUCCH resource configured by the higher layer signaling for CSI feedback; or, in a case of only feeding back an SR or transmitting an HARQ-ACK on a PUCCH resource corresponding to an SR, determining at least one PUCCH resource configured by the higher layer signaling for SR feedback; or, in a case of only feeding back CSI and an SR, determining at least one PUCCH resource configured by the higher layer signaling for the CSI.

Optionally, the determining, according to the PUCCH resource, the resource used for transmitting the PUCCH in the sub-slot includes:

determining the resource used for transmitting the PUCCH in the sub-slot according to at least one of a start symbol index of a PUCCH or the quantity of PUCCH occupation symbols of the PUCCH resource.

Optionally, the determining the resource used for transmitting the PUCCH in the sub-slot according to at least one of the start symbol index of the PUCCH or the quantity of the PUCCH occupation symbols of the PUCCH resource includes:

determining that the PUCCH is to be transmitted by occupying L symbols starting from an (s+1)-th symbol in the sub-slot, according to the start symbol index of the PUCCH and the quantity of the PUCCH occupation symbols of the PUCCH resource, where s is the start symbol index of the PUCCH, s is numbered from 0, and L is the quantity of the PUCCH occupation symbols; or, according to the start symbol index of the PUCCH and the quantity of the PUCCH occupation symbols of the PUCCH resource and a start symbol of the sub-slot, determining that the resource used for transmitting the PUCCH in the sub-slot includes: L symbols starting from a symbol with an index of (s+j) in a slot containing the sub-slot, where s is the start symbol index of the PUCCH, s is numbered from 0, the start symbol of the sub-slot has an index of j in the slot, j is numbered from 0, and L is the quantity of the PUCCH occupation symbols.

Optionally, in a case that a time domain position for transmitting the PUCCH determined according to the PUCCH resource crosses a boundary of the sub-slot, an end symbol of the PUCCH in the sub-slot is an end symbol of the sub-slot.

Optionally, that the time domain position for transmitting the PUCCH determined according to the PUCCH resource crosses the boundary of the sub-slot includes:

the quantity of symbols used for transmitting the PUCCH determined according to the PUCCH resource exceeds the quantity of symbols of the sub-slot; and/or, an end symbol of the PUCCH determined according to the PUCCH resource is after the end symbol of the sub-slot.

Optionally, a time domain position for transmitting the PUCCH determined according to the PUCCH resource does not cross a boundary of the sub-slot.

Optionally, that the time domain position for transmitting the PUCCH determined according to the PUCCH resource does not cross the boundary of the sub-slot includes:

the quantity of PUCCH occupation symbols corresponding to the PUCCH resource is less than or equal to the quantity of symbols in a sub-slot with a minimum quantity of symbols in a slot; and/or, an end symbol of the PUCCH transmitted in a sub-slot determined according to the start symbol index of the PUCCH and the quantity of PUCCH occupation symbols corresponding to the PUCCH resource is not after an end symbol of a sub-slot with the minimum quantity of symbols in the slot.

It should be noted that the communication device in the above embodiments may be a communication device in any implementation of the method according to the embodiments of the present disclosure. Any implementation of the communication device in the method according to the embodiments of the present disclosure may be achieved by the communication device in the above embodiments, and the same beneficial effects can be achieved, which is not described in detail herein.

The embodiments of the present disclosure also provide a computer-readable storage medium on which a computer program is stored, and the program, when being executed by a processor, implements the steps in the method for PUCCH resource determination provided by the embodiments of the present disclosure.

In the embodiments of the present disclosure, it should be understood that the disclosed device and method may be implemented in other ways. For example, the described embodiments directed to the device are merely exemplary. For example, the units are divided merely in logical function, which may be divided in another way in actual implementation, e.g., multiple units or components may be combined or integrated into another system, or some features may be ignored or not performed. In addition, the disclosed or discussed mutual coupling or direct coupling or communication connection may be implemented through some interfaces, and the indirect coupling or communication connection between devices or units may be implemented in electronic, mechanical or other forms.

In addition, functional units in various embodiments of the present disclosure may be integrated into one processing unit, or may be physically independent, or two or more units may be integrated into one unit. The integrated unit may be implemented in form of hardware, or may be implemented in form of a combination of hardware and software functional unit.

The integrated unit implemented in form of software functional unit may be stored in a computer readable storage medium. The software functional unit is stored in a storage medium, and includes several instructions for instructing a computer device (which may be a personal computer, a server, or a network device, etc.) to perform a part of the steps of the method described in the embodiments of the present disclosure. The storage medium includes any medium that can store program code, such as a Universal Serial Bus (USB) flash drive, a mobile hard disk, a Read-Only Memory (ROM), a Random Access Memory (RAM), a magnetic disk, or an optical disc.

It can be understood that the embodiments described in the present disclosure may be implemented by hardware, software, firmware, middleware, microcode, or a combination thereof. For hardware implementation, the modules, units, subunits or submodules may be implemented in one or more application specific integrated circuits (Application Specific Integrated Circuit, ASIC), digital signal processors (Digital Signal Processor, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, others electronic units for performing the functions described in the present disclosure, or a combination thereof.

For software implementation, the technologies described in the embodiments of the present disclosure may be implemented by modules (such as processes, functions, etc.) that perform the functions described in the embodiments of the present disclosure. Software codes may be stored in a memory and executed by a processor. The memory may be implemented in the processor or external to the processor.

Optional embodiments of the present disclosure are described in the above. It should be noted that those skilled in the art may make various improvements and modifications without departing from the principles described in the present disclosure, and the various improvements and modifications fall within the protection scope of the present disclosure.

What is claimed is:

1. A method for physical uplink control channel (PUCCH) resource determination, comprising:
   determining a PUCCH resource, and determining a sub-slot where a PUCCH is to be transmitted; and
   determining, according to the PUCCH resource, a resource used for transmitting the PUCCH in the sub-slot;
   wherein the determining, according to the PUCCH resource, the resource used for transmitting the PUCCH in the sub-slot comprises:
   determining the resource used for transmitting the PUCCH in the sub-slot according to at least one of a start symbol index of a PUCCH or the quantity of PUCCH occupation symbols of the PUCCH resource;
   wherein the determining the resource used for transmitting the PUCCH in the sub-slot according to at least one of the start symbol index of the PUCCH or the quantity of the PUCCH occupation symbols of the PUCCH resource comprises:
   according to the start symbol index of the PUCCH and the quantity of the PUCCH occupation symbols of the PUCCH resource and a start symbol of the sub-slot, determining that the resource used for transmitting the PUCCH in the sub-slot comprises: L symbols starting from a symbol with an index of (s+j) in a slot containing the sub-slot, wherein s is the start symbol index of the PUCCH, s is numbered from 0, the start symbol of the sub-slot has an index of i in the slot, i is numbered from 0, and L is the quantity of the PUCCH occupation symbols.

2. The method according to claim 1, wherein a start symbol of the PUCCH resource is a relative start symbol with respect to a start position of the sub-slot.

3. The method according to claim 1, wherein the determining the PUCCH resource comprises:
   determining at least one PUCCH resource from a PUCCH resource set according to a PUCCH resource indication field in a physical downlink control channel (PDCCH); or,
   determining at least one PUCCH resource configured by higher layer signaling.

4. The method according to claim 3, wherein the determining the at least one PUCCH resource from the PUCCH resource set according to the PUCCH resource indication field in the PDCCH comprises:
   in a case that a hybrid automatic repeat request acknowledgement (HARQ-ACK) needs to be fed back in the sub-slot for a physical downlink shared channel (PDSCH) scheduled by the PDCCH, and/or, an HARQ-ACK needs to be fed back in the sub-slot for the PDCCH indicating semi-persistent scheduling (SPS) PDSCH release, selecting a PUCCH resource set from a group of PUCCH resource sets according to the quantity of bits of uplink control information (UCI) that comprises the HARQ-ACK and is transmitted in the sub-slot, and determining at least one PUCCH resource from the PUCCH resource set according to the PUCCH resource indication field in the PDCCH.

5. The method according to claim 4, wherein the determining the at least one PUCCH resource from the PUCCH resource set according to the PUCCH resource indication field in the PDCCH further comprises at least one of the following:
   PUCCH resources in the group of PUCCH resource sets are applicable to a plurality of sub-slots in a slot;
   the group of PUCCH resource sets comprises one or more PUCCH resource sets; or,
   in a case that the quantity of the PDCCH is more than one, the PUCCH resource indication field is a PUCCH resource indication field of a PDCCH whose time domain position is a last one among time domain positions of the more than one PDCCHs.

6. The method according to claim 3, wherein the determining the at least one PUCCH resource configured by the higher layer signaling comprises:
   in a case of only feeding back an HARQ-ACK for an SPS PDSCH, determining at least one PUCCH resource configured by the higher layer signaling for feeding back the HARQ-ACK for the SPS PDSCH; or,
   in a case of only feeding back channel state information (CSI), or transmitting CSI and an HARQ-ACK on a PUCCH resource corresponding to the CSI, or transmitting CSI, an HARQ-ACK and a scheduling request (SR) on a PUCCH resource corresponding to the CSI, determining at least one PUCCH resource configured by the higher layer signaling for CSI feedback; or,
   in a case of only feeding back an SR or transmitting an HARQ-ACK on a PUCCH resource corresponding to an SR, determining at least one PUCCH resource configured by the higher layer signaling for SR feedback; or,
   in a case of only feeding back CSI and an SR, determining at least one PUCCH resource configured by the higher layer signaling for the CSI.

7. The method according to claim 1, wherein:
   in a case that a time domain position for transmitting the PUCCH determined according to the PUCCH resource crosses a boundary of the sub-slot, determining an end symbol of the PUCCH in the sub-slot as an end symbol of the sub-slot; or,
   a time domain position for transmitting the PUCCH determined according to the PUCCH resource never cross a boundary of the sub-slot.

8. The method according to claim 7, wherein that the time domain position for transmitting the PUCCH determined according to the PUCCH resource crosses the boundary of the sub-slot comprises:
   the quantity of symbols used for transmitting the PUCCH determined according to the PUCCH resource exceeds the quantity of symbols of the sub-slot; and/or,
   an end symbol of the PUCCH determined according to the PUCCH resource is after the end symbol of the sub-slot;
   wherein that the time domain position for transmitting the PUCCH determined according to the PUCCH resource never cross the boundary of the sub-slot comprises:
   the quantity of PUCCH occupation symbols corresponding to the PUCCH resource is less than or equal to the quantity of symbols in a sub-slot with a minimum quantity of symbols in a slot; and/or,
an end symbol of the PUCCH transmitted in a sub-slot determined according to the start symbol index of the PUCCH and the quantity of PUCCH occupation symbols corresponding to the PUCCH resource is not after an end symbol of a sub-slot with the minimum quantity of symbols in the slot.

9. A communication device, comprising: a transceiver, a memory, a processor, and a program stored on the memory and executable by the processor;
wherein the processor is configured to determine a PUCCH resource, and determine a sub-slot where a PUCCH is to be transmitted; and
wherein the processor is further configured to determine, according to the PUCCH resource, a resource used for transmitting the PUCCH in the sub-slot;
wherein the determining, according to the PUCCH resource, the resource used for transmitting the PUCCH in the sub-slot comprises:
determining the resource used for transmitting the PUCCH in the sub-slot according to at least one of a start symbol index of a PUCCH or the quantity of PUCCH occupation symbols of the PUCCH resource;
wherein the determining the resource used for transmitting the PUCCH in the sub-slot according to at least one of the start symbol index of the PUCCH or the quantity of the PUCCH occupation symbols of the PUCCH resource comprises:
according to the start symbol index of the PUCCH and the quantity of the PUCCH occupation symbols of the PUCCH resource and a start symbol of the sub-slot, determining that the resource used for transmitting the PUCCH in the sub-slot comprises: L symbols starting from a symbol with an index of (s+j) in a slot containing the sub-slot, wherein s is the start symbol index of the PUCCH, s is numbered from 0, the start symbol of the sub-slot has an index of j in the slot, i is numbered from 0, and L is the quantity of the PUCCH occupation symbols.

10. The communication device according to claim 9, wherein a start symbol of the PUCCH resource is a relative start symbol with respect to a start position of the sub-slot.

11. The communication device according to claim 9, wherein the determining the PUCCH resource comprises:
determining at least one PUCCH resource from a PUCCH resource set according to a PUCCH resource indication field in a physical downlink control channel (PDCCH); or,
determining at least one PUCCH resource configured by higher layer signaling.

12. The communication device according to claim 11, wherein the determining the at least one PUCCH resource from the PUCCH resource set according to the PUCCH resource indication field in the PDCCH comprises:
in a case that a hybrid automatic repeat request acknowledgement (HARQ-ACK) needs to be fed back in the sub-slot for a physical downlink shared channel (PDSCH) scheduled by the PDCCH, and/or, an HARQ-ACK needs to be fed back in the sub-slot for the PDCCH indicating semi-persistent scheduling (SPS) PDSCH release, selecting a PUCCH resource set from a group of PUCCH resource sets according to the quantity of bits of uplink control information (UCI) that comprises the HARQ-ACK and is transmitted in the sub-slot, and determining at least one PUCCH resource from the PUCCH resource set according to the PUCCH resource indication field in the PDCCH.

13. The communication device according to claim 12, wherein the determining the at least one PUCCH resource from the PUCCH resource set according to the PUCCH resource indication field in the PDCCH further comprises at least one of the following:
PUCCH resources in the group of PUCCH resource sets are applicable to a plurality of sub-slots in a slot;
the group of PUCCH resource sets comprises one or more PUCCH resource sets; or,
in a case that the quantity of the PDCCH is more than one, the PUCCH resource indication field is a PUCCH resource indication field of a PDCCH whose time domain position is a last one among time domain positions of the more than one PDCCHs.

14. The communication device according to claim 11, wherein the determining the at least one PUCCH resource configured by the higher layer signaling comprises:
in a case of only feeding back an HARQ-ACK for an SPS PDSCH, determining at least one PUCCH resource configured by the higher layer signaling for feeding back the HARQ-ACK for the SPS PDSCH; or,
in a case of only feeding back channel state information (CSI), or transmitting CSI and an HARQ-ACK on a PUCCH resource corresponding to the CSI, or transmitting CSI, an HARQ-ACK and a scheduling request (SR) on a PUCCH resource corresponding to the CSI, determining at least one PUCCH resource configured by the higher layer signaling for CSI feedback; or,
in a case of only feeding back an SR or transmitting an HARQ-ACK on a PUCCH resource corresponding to an SR, determining at least one PUCCH resource configured by the higher layer signaling for SR feedback; or,
in a case of only feeding back CSI and an SR, determining at least one PUCCH resource configured by the higher layer signaling for the CSI.

15. The communication device according to claim 9, wherein:
in a case that a time domain position for transmitting the PUCCH determined according to the PUCCH resource crosses a boundary of the sub-slot, determining an end symbol of the PUCCH in the sub-slot as an end symbol of the sub-slot; or,
a time domain position for transmitting the PUCCH determined according to the PUCCH resource never cross a boundary of the sub-slot.

16. The communication device according to claim 15, wherein that the time domain position for transmitting the PUCCH determined according to the PUCCH resource crosses the boundary of the sub-slot comprises:
the quantity of symbols used for transmitting the PUCCH determined according to the PUCCH resource exceeds the quantity of symbols of the sub-slot; and/or, an end symbol of the PUCCH determined according to the PUCCH resource is after the end symbol of the sub-slot;
wherein that the time domain position for transmitting the PUCCH determined according to the PUCCH resource never cross the boundary of the sub-slot comprises:
the quantity of PUCCH occupation symbols corresponding to the PUCCH resource is less than or equal to the quantity of symbols in a sub-slot with a minimum quantity of symbols in a slot; and/or,
an end symbol of the PUCCH transmitted in a sub-slot determined according to the start symbol index of the PUCCH and the quantity of PUCCH occupation symbols corresponding to the PUCCH resource is not after an end symbol of a sub-slot with the minimum quantity of symbols in the slot.

* * * * *